(12) United States Patent
    Whittington

(10) Patent No.: US 10,898,844 B2
(45) Date of Patent:   Jan. 26, 2021

(54) CLEAN-AIR FILTRATION SYSTEM AND METHOD OF OPERATING THE CLEAN-AIR FILTRATION SYSTEM

(71) Applicant: Peter Whittington, Oakland Park, FL (US)

(72) Inventor: Peter Whittington, Oakland Park, FL (US)

( * ) Notice: Subject to any disclaimer, the term of this patent is extended or adjusted under 35 U.S.C. 154(b) by 624 days.

(21) Appl. No.: 15/718,651

(22) Filed: Sep. 28, 2017

(65) Prior Publication Data

US 2018/0304189 A1    Oct. 25, 2018

Related U.S. Application Data

(60) Provisional application No. 62/489,763, filed on Apr. 25, 2017.

(51) Int. Cl.
| | |
|---|---|
| *B01D 47/06* | (2006.01) |
| *B01D 46/10* | (2006.01) |
| *B01D 50/00* | (2006.01) |
| *B01D 46/00* | (2006.01) |
| *B01D 45/12* | (2006.01) |

(52) U.S. Cl.
    CPC ............ *B01D 47/06* (2013.01); *B01D 45/12* (2013.01); *B01D 46/0045* (2013.01); *B01D 46/0086* (2013.01); *B01D 46/10* (2013.01); *B01D 50/006* (2013.01); *B01D 2247/101* (2013.01); *B01D 2247/105* (2013.01)

(58) Field of Classification Search
    None
    See application file for complete search history.

(56) References Cited

U.S. PATENT DOCUMENTS

| | | | |
|---|---|---|---|
| 3,102,800 | A | 9/1963 | Bora |
| 3,797,204 | A | 3/1974 | Cavatassi |
| 5,145,498 | A | 9/1992 | Houston |
| 5,240,482 | A | 8/1993 | Sung |
| 9,643,117 | B2 * | 5/2017 | Rahlin .................. B01D 53/78 |

* cited by examiner

*Primary Examiner* — Christopher P Jones
*Assistant Examiner* — Phillip Y Shao
(74) *Attorney, Agent, or Firm* — Laurence A. Greenberg; Werner H. Stemer; Ralph E. Locher

(57) ABSTRACT

A clean-air filtration system has a main pipe with an entry for attaching to an exhaust source and an exit. The main pipe has a plurality of openings for dispersing water within the main pipe. A water source is connected to the main pipe and supplying water to the openings. A particulate interceptor is connected to the main pipe for removing particulates from an exhaust flow. A particulate storage unit is connected to the particulate interceptor.

19 Claims, 6 Drawing Sheets

CLEAN-AIR FILTRATION SYSTEM AND METHOD OF OPERATING THE CLEAN-AIR FILTRATION SYSTEM

CROSS-REFERENCE TO RELATED APPLICATION

This application claims the priority, under 35 U.S.C. § 119, of U.S. provisional application No. 62/489,763, filed Apr. 25, 2017; the prior application is herewith incorporated by reference in its entirety.

BACKGROUND OF THE INVENTION

Field of the Invention

The invention relates to a clean-air filtration system that is for use in industrial applications and, more particularly, for use on a smoke stack for particulate removal from exhaust gases output via the smoke stack.

Current environmental preoccupations stress more and more the importance of the quality of the air we breathe. It is widely acknowledged that industrial plants, such as those that synthesize chemical compounds or that burn fuels such as coal, produce a large amount of atmospheric pollution that is detrimental to the health of not only the workers at the immediate vicinity of the plant but also the residents of the neighboring cities. Air pollution is commonly considered a mixture of solid particles and gases in the air. Such particles may include dust, pollen and mold spores in additional to industrial pollutants.

In some countries such as China air pollution in certain industrial regions has reached such high levels that companies are limited to a maximum of 3 days per week of operation in an effort to limit air pollution. This has a significant negative impact on millions of dependents around the world. A system for effectively filtering particulate matter from exhaust gases of manufacturing facilities that is cost effective and of a generally non-complex nature is desired.

U.S. Pat. No. 3,102,800 to Bora teaches a smoke and fume eliminator in which exhaust gases are submitted to several stages of receiving water to flush the smoke particles and fumes and to effect a cleaning action upon the exhaust gases.

U.S. Pat. No. 3,797,204 to Cavatassi teaches a smoke wash apparatus which uses a plurality of sprinkler heads for spraying a curtain of water over passing exhaust gases. The curtain of water removes particulate and those gases soluble in water. The containment laden water is directed to a collection tank where the containments are removed from the water so that the water can be recycled to the sprinkler heads.

BRIEF SUMMARY OF THE INVENTION

It is accordingly an object of the invention to provide a clean-air filtration system and method of operating the clean-air filtration system that overcome the above-mentioned disadvantages of the prior art devices and methods of this general type and which removes particulates and gases from exhaust gases output by manufacturing plants.

With the foregoing and other objects in view there is provided, in accordance with the invention, a clean-air filtration system containing a flexible inlet tube for attaching to an exhaust gas source outputting an exhaust gas stream, a main pipe connected to the flexible inlet tube and conducting the exhaust gas stream, and a filter system disposed downstream of the flexible inlet tube in the main pipe. The filter system has a filter for removing particulates from the exhaust gas stream. A water source conducts water to the main pipe. A section of the main pipe is a water injection stage injecting water into the passing exhaust gas stream. The water collides with the exhaust gas stream entrapping particulates and water soluble gases and forming a gummy coagulant formed of water and entrapped particulates and gases. The water injection stage has a loop with a curved shape that bends around and crosses itself. The loop subjects the gummy coagulant traversing the loop to centrifugal forces. A particulate interceptor is connected to the main pipe in a loop section for receiving the gummy coagulant.

An important inventive feature of the instant application resides in the positioning of the loop in the water injection stage or immediately downstream of the water injection stage. Due to the loop, the gummy coagulants are subjected to significant centrifugal forces and thus slam into the curved portions of the loop and by gravity fall into the pipe connected to the particle interceptor. In this manner, an effective, non-complex and inexpensive to operate clean-air filtration system is possible.

In accordance with an added feature of the invention, the main pipe in the section defining the water injection stage is a doubled layered pipe having an outer layer, an inner layer and a space defined between the inner layer and the outer layer. The inner layer has a plurality of nozzle openings and water travels in the space to the nozzle openings where the water is injected into the exhaust gas stream. In this manner, only simple slots are needed and a method for controlling the water pressure for injecting a controlled quantity water into the passing exhaust gas stream. Thus there are few mechanical parts to break and inexpensive construction costs.

In accordance with another feature of the invention, the main pipe in the section defining the water injection stage is a doubled layered pipe having an outer layer, an inner layer and a space defined between the inner layer and the outer layer. Controllable water injectors are disposed on an interior wall of the inner layer for injecting water into the exhaust gas stream. The controllable water injectors are disposed along the main pipe in a section between a turbine suction engine and an exhaust gas exit. The controllable water injectors are individually controllable for defining on/off conditions, pressure conditions and spray velocity, therefore defining a customizable length of the water injection stage by turning off and on the controllable water injectors. Therefore the water injection stage can be customized in length, water pressure, and spray velocity, all in dependence on the anticipated type of exhaust gas flow. Additionally, a single clean-air filtration system design can be used for cleaning many different types of exhaust gas flows.

In accordance with a further feature of the invention, the particulate interceptor is gravity fed from the main pipe. Therefore no mechanical pumps are necessary and the clean-air filtration system is less expensive to produce and operate.

In accordance with yet another feature of the invention, an outlet pipe with a pump disposed in the outlet pump is provided. In this manner a longer outlet pipe can be used for connecting the particulate interceptor to the main pipe. The pump pumps the gummy coagulant from main pipe to a particulate interceptor which may be disposed at a significant distance from the main pipe providing flexibility in design.

In accordance with yet another feature of the invention, a turbine suction engine is disposed upstream of the water injection stage. The turbine suction engine defines a velocity and pressure of the exhaust gas stream.

In accordance with another additional feature of the invention, an exhaust gas exit is disposed at an end of the main pipe for releasing the cleansed exhaust stream into the atmosphere.

In accordance with yet another added feature of the invention, the water injection stage extends between the turbine suction engine and the exhaust gas exit.

In accordance with an embodiment of the invention, a controller defines the on/off conditions, the pressure conditions and the spray velocity of the water leaving the water injectors.

In accordance with a further embodiment of the invention, the filter system has a fan for moving the exhaust gas stream along inside the main tube and a cover plate for protecting the filter and the fan from being damage by large particulates and/or high velocity speeds of the exhaust gas stream.

In accordance with another embodiment of the invention, the filter system is one of at least five filter systems disposed in the main pipe.

With the foregoing and other objects in view there is provided, in accordance with the invention, a method for cleaning an exhaust gas stream. The method includes connecting a flexible inlet tube of a clean-air filtration system to an exhaust pipe transporting the exhaust gas stream, conducting a flow of the exhaust gas stream into a main pipe connected to the flexible inlet tube and conducting the exhaust gas stream past a filter system disposed downstream of the flexible inlet tube in the main pipe. The filter system has a filter for removing particulates from the exhaust gas stream. The exhaust gas stream is then conducted into a water injection stage of the main pipe where water is injected into the exhaust gas stream passing by. The water collides with the exhaust gas stream entrapping particulates and water soluble gases and forming a gummy coagulant formed of water and entrapped particulates and gases. The water injection stage has a loop with a curved shape that bends around and crosses itself, the loop subjects the gummy coagulant traversing the loop to centrifugal forces. The gummy coagulant is then conducted into a particulate interceptor.

In accordance with an added mode of the invention, the controllable water injectors are set individually for defining on/off conditions, pressure conditions and spray velocity, therefore defining a customizable length of the water injection stage with customizable pressure conditions and spray velocities all based on a type of the exhaust gas stream to be cleaned.

In a further mode of the invention, the water portions and the particular portions in the particulate interceptor are separated from each other. The recovered water is then filtered and the filtered water is transported back to a water reservoir to be reused once again in the water injection stage. The separated particulate matter is pumped to a storage tank disposed downstream of the particulate interceptor.

Although the invention is illustrated and described herein as embodied in a clean-air filtration system a method of operating the air filtration system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
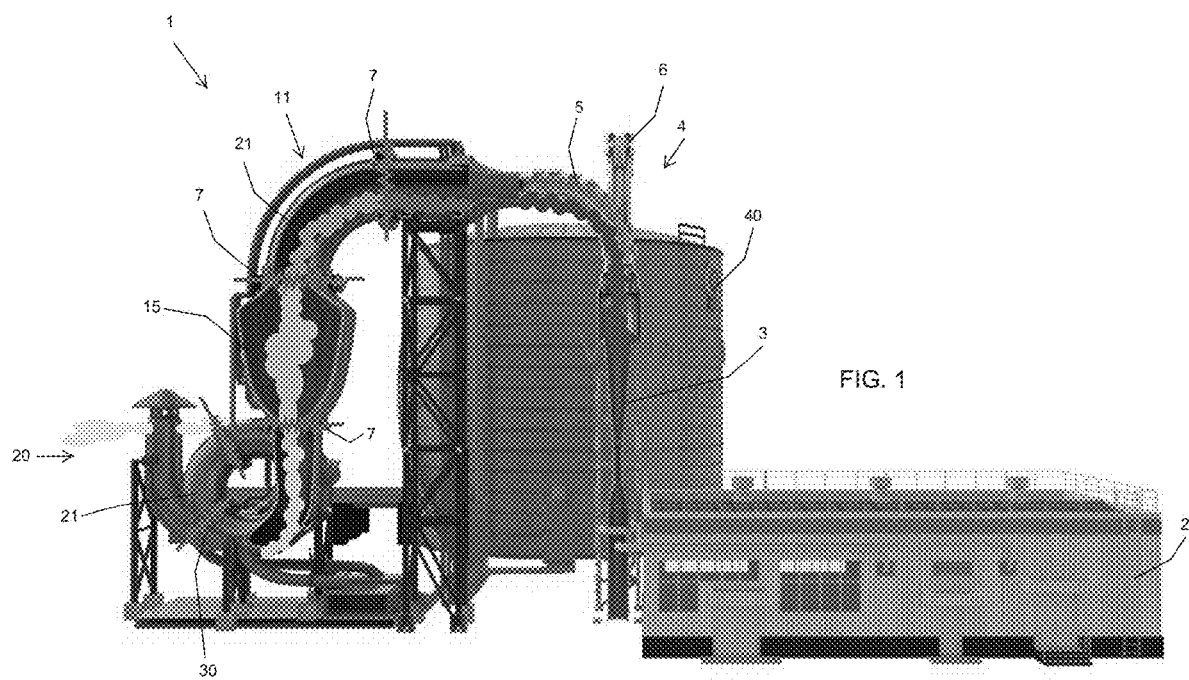
FIG. 1 is a diagrammatic, perspective view of a clean-air filtration system in accordance with the invention.

Referring now to the figures of the drawings in detail and first, particularly to FIG. 1 thereof, there is shown a clean-air filtration system 1 connected to a manufacturing facility 2. The clean-air filtration system 1 is configured with the overriding purpose of reducing particulate matter emissions produced by the manufacturing facility 2, namely by removing 70-90% of particulate matter in an exhaust gas or emission stream. The manufacturing facility 2 has a smoke or exhaust stack 3. The clean-air filtration system 1 has an input stage 4 made of a flexible tube 5, preferably a metal flex tube 5 with an integrated emergency bypass vent 6. The metal flex tube 5 is inserted into an outlet of the exhaust stack 3. An end of the metal flex tube 5 is weighted and has a seal for engaging in the end of the exhaust stack 3. In an alternative embodiment, the metal flex tube 5 can be physically attached to the exhaust stack 3. The metal flex tube 5 channels the exhaust gas stream into the clean-air filtration system 1.

In case the clean filtration system 1 is not operational or not properly functioning, the emergency bypass vent 6 can vent the exhaust gas stream directly into the environment thus bypassing downstream stages of the clean filtration system 1.

Figure 2:
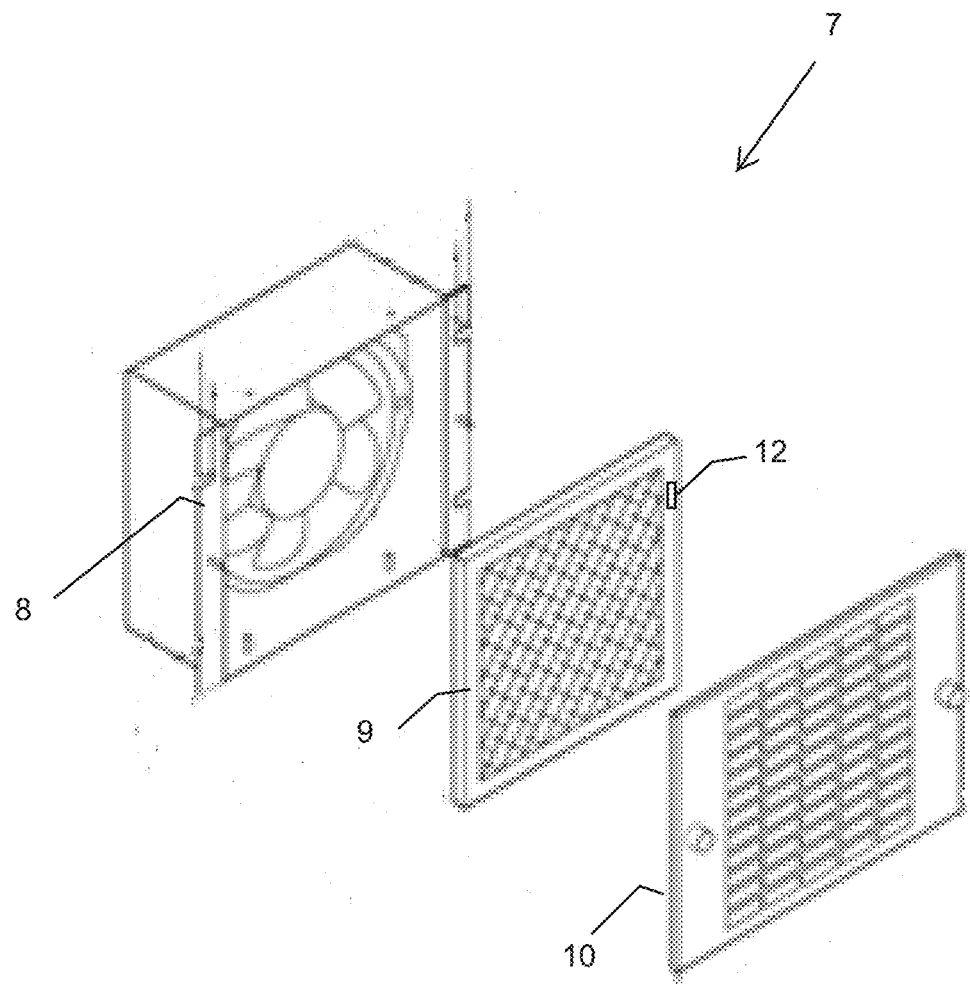
FIG. 2 is a perspective view of a filter assembly.

Connected next to the input stage 4 is a filter stage 11. Within the filter stage 11 are at least two filter assemblies 7. As best shown in FIG. 2, each of the filter assemblies 7 has a fan 8, a filter 9 and a filter face plate 10. Each of the filter assemblies 7 removes soot particles based on the design of the filter 9. More specifically, the different filters 9 may each be configured to remove different particle sizes. The actually number of filter assemblies 7 varies in dependence on the type of exhaust gases being output by the manufacturing facility 2. The fan 8 is configured to move the exhaust gases through the filter assembly 7 and the filter face plate 10 is configured to protect the filter assembly from large particles that would damage the filters 9 or the fan 8. The design of the filter face plate 10 is one of many possible designs which is dependent on the type of expected exhaust gases.

Located on the filter 9 is a filter sensor and/or embedded security chip 12. The filter sensor 12 monitors the effectiveness of the filter 9 and alerts an operator when maintenance (e.g. cleaning) or replacement of the filter 9 is necessary. The filter sensor 12 further monitors the operational state of the filter assembly 7 and provides identifying information as to its component parts.

Located downstream of the filter stage 11 is a turbine suction engine 15. The turbine suction engine 15 sets the pressure and speed of the exhaust gas stream flow before entering a water injection stage 20. Disposed after or at the end of the turbine suction engine 15, is a third filter assembly 7 which may be configured without a fan assembly 8.

Figure 3:
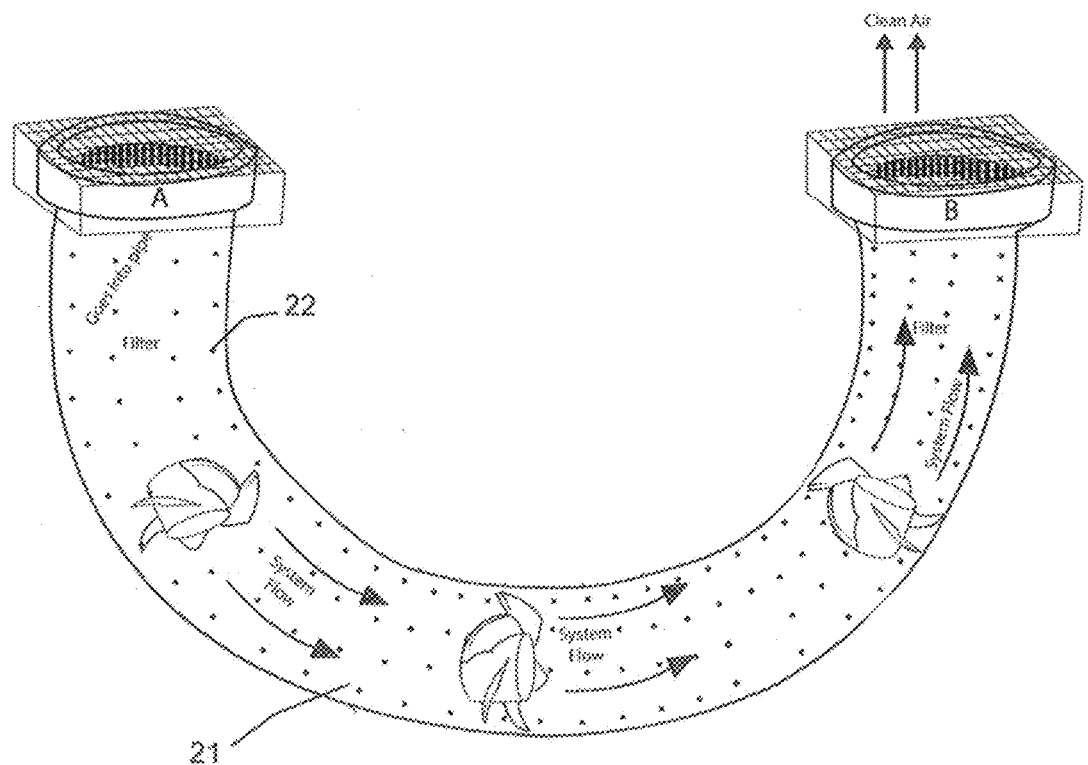
FIG. 3 is sectional view of a transport tube having water injection nozzles formed therein.
Figure 4:
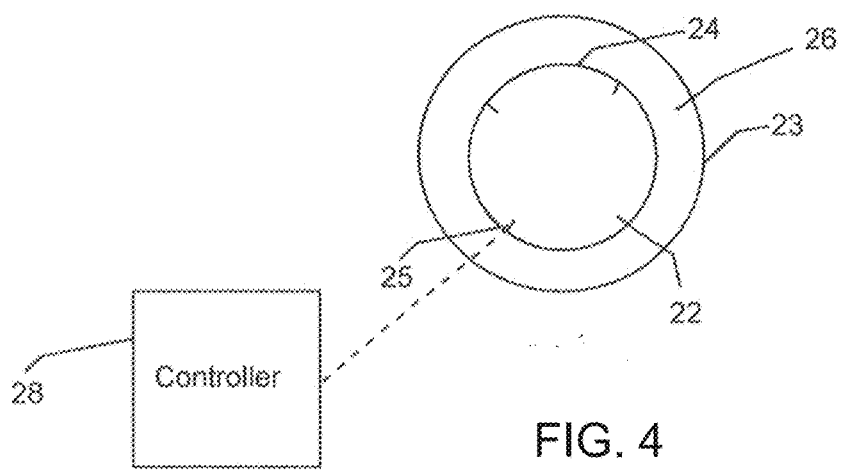
FIG. 4 is a cross sectional view of the transport tube with water injection nozzles disposed therein.

After the third filter assembly 7 is the water injection stage 20. In the water injection stage 20 water is injected into the exhaust flow from all directions. The water is injected toward the exhaust gas flow by a plurality of nozzles 22 disposed in or around a transport tube 21 defining the water injection stage 20, see FIG. 3. As shown in FIGS. 3 and 4, the transport tube 21 in the area of the water injection stage 20 is a doubled layered tube which has an outer layer 23 and an inner layer 24 with an air space 26 disposed between the layers 23, 24. The inner layer 24 has the plurality of nozzles 22 formed therein and may be in the form of slits in the inner layer 24. In this way, pressurized water is provided between the inner layer 24 and the outer layer 23 and ejects out via the nozzles 22 into the exhaust gas stream.

Alternatively, and as shown in FIG. 4, the nozzles 22 can have injector nozzles 25 (e.g. sprayer heads) disposed therein for directly injecting water into the water injection stage 20. What is important is that a water jet spray, stream or water mist is injected into the incoming exhaust gas stream and mixes with particulate matter and water soluble gases in the exhaust gas flow and forms a gummy coagulant. FIGS. 3 and 4 show just two possible embodiments for injecting water into the exhaust gas stream. Clearly there are many other possible ways for providing a water injection means.

Figure 5:
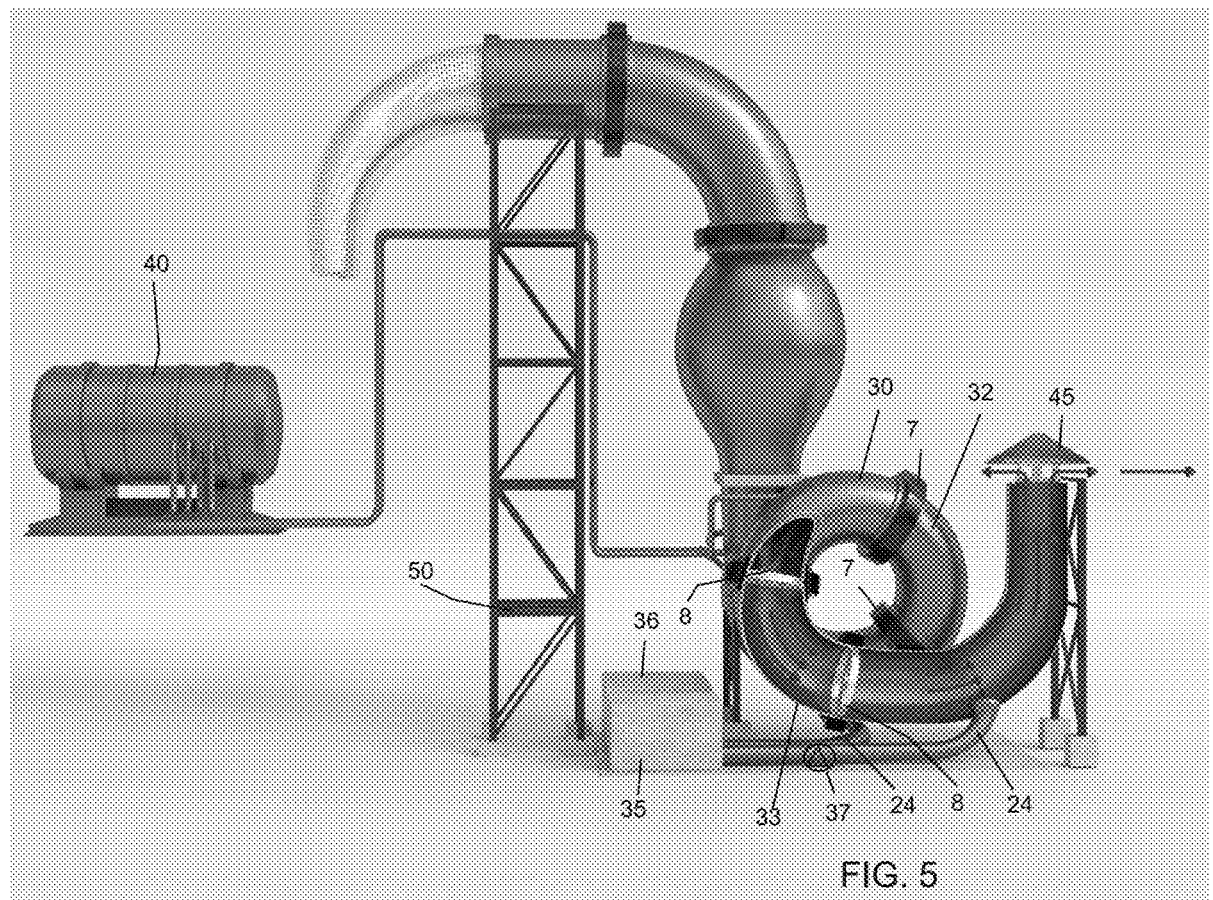
FIG. 5 is a further perspective view of the air filtration system.
Figure 6:
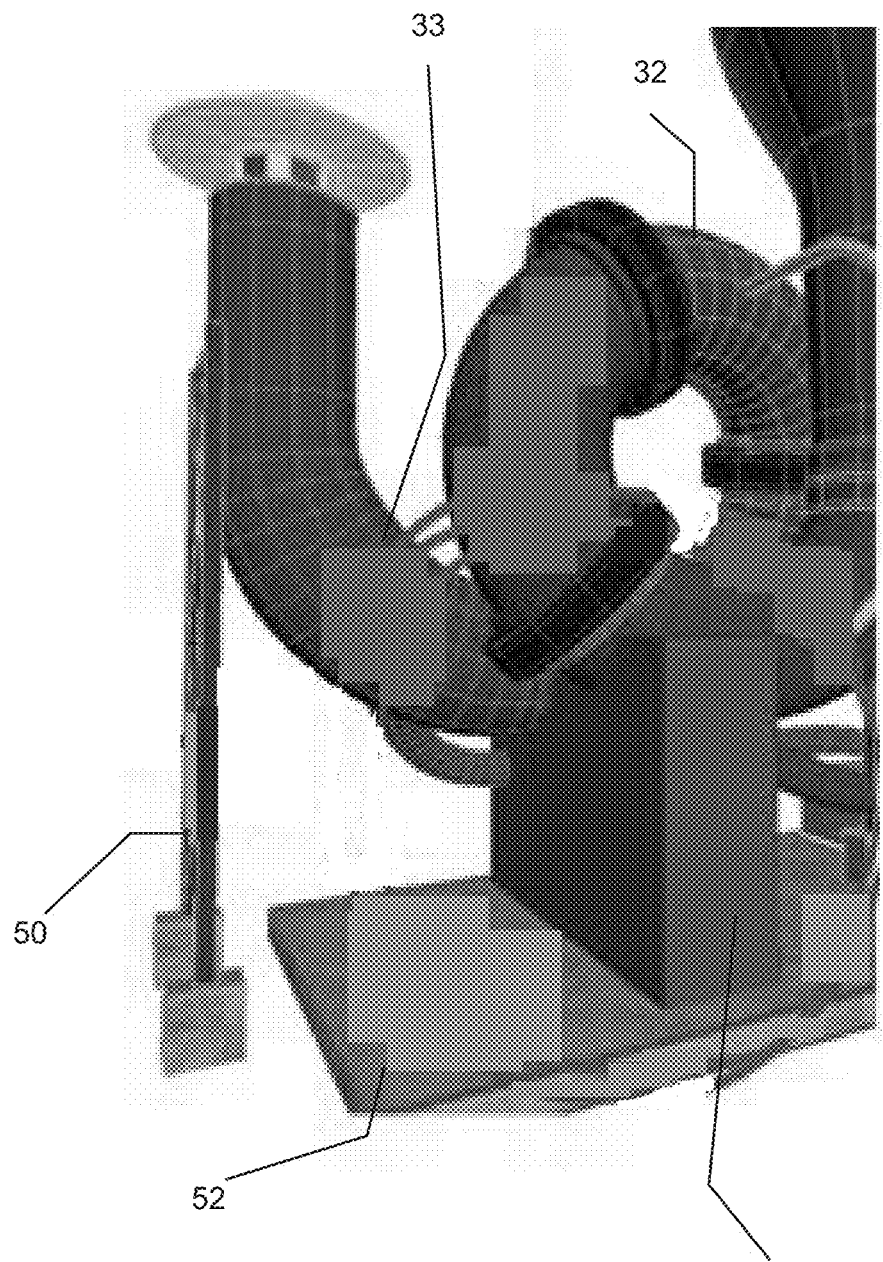
FIG. 6 is a perspective view showing a loop portion of the air filtration system.
Figure 7:
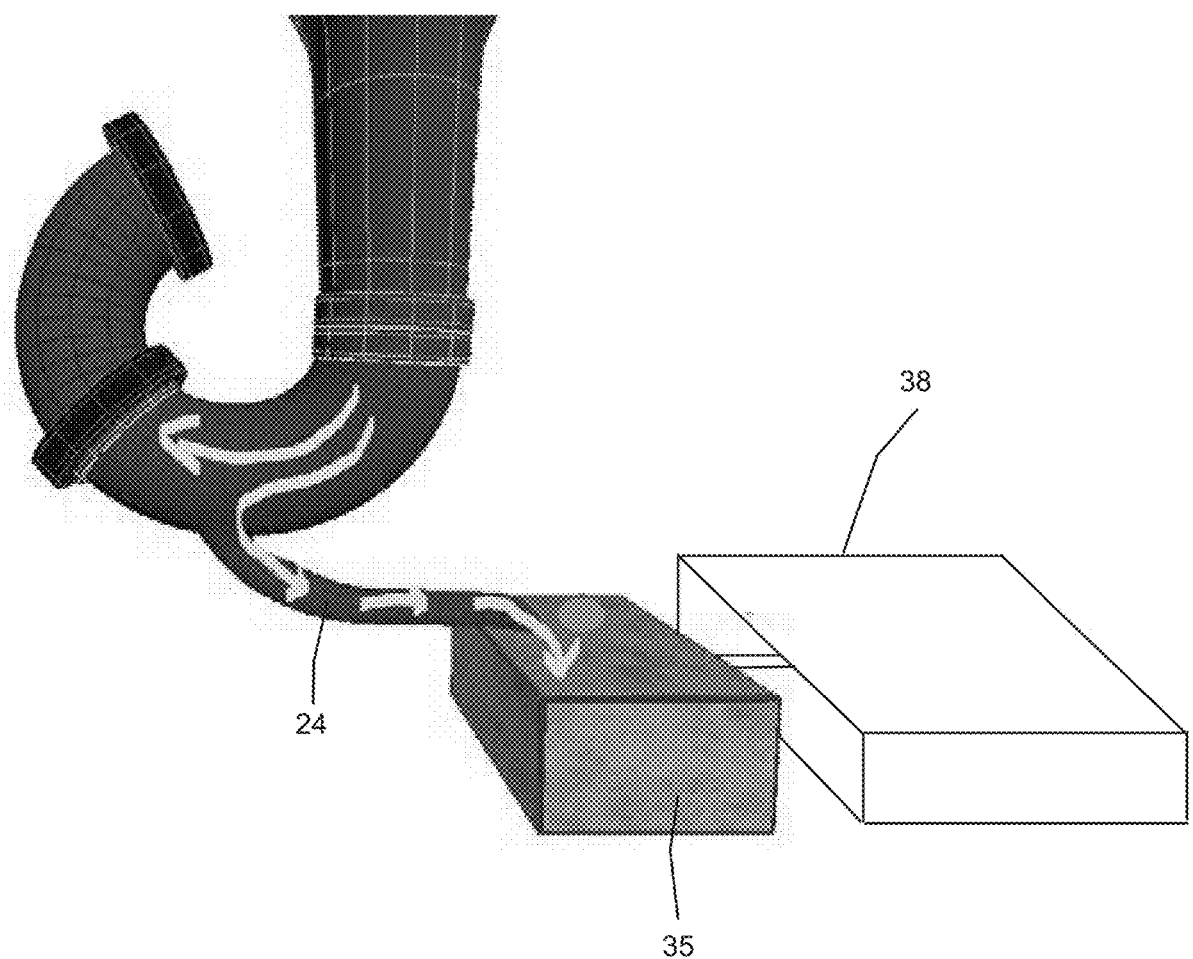
FIG. 7 is an illustration showing an interceptor.

As can be seen best in FIGS. 5-7, the transport tube 21 in the water injection stage 20 has a corkscrew or loop 30 which subjects the exhaust gas flow to centrifugal forces (e.g. weighted objects traveling in a circle behave as if they are experiencing an outward force). Due to its weight and the effects of gravity and centrifugal forces, the heavy gummy coagulant smashes into the walls of the transport tube 21 and naturally exit through one of two output pipes 24 strategically placed at a bottom of loop sections 32, 33 of the transport tube 21. More specifically, due to the gravitational and centrifugal forces acting on the gummy coagulant in the transport pipe 21, the gummy coagulant sticks to the walls of the transport tube 21 as it tries to make a first corner or section of the first loop section 32. The gummy coagulant then falls into a first output pipe 24 down into a first interceptor 35. The remaining exhaust gases continue through the second loop section 33 and are once again subject to additional gravitational and centrifugal forces and additional gummy coagulant falls into a second output pipe 24 into a second interceptor 36. As can be seen in FIG. 5 at least two more filter assemblies 7 are disposed in the loop 30. In addition, further fan assemblies 8 may be provided as necessary.

The gummy coagulant falls by the force of gravity into the first and second output pipes 24 and from there into the interceptors 35, 36. Optionally a pump 37 may be provided in the output pipes 24 in dependence on the need and position of the interceptors 35 and 36 in relationship to the loop sections 32, 33 for transporting the gummy coagulant to the interceptors 35, 36. In the interceptors 35, 36, the gummy coagulant is broken down into the particles removed from the exhaust gas stream, water soluble gases, and water. The existing water is further filtered and returned to a water reservoir 40. In this manner, the water is continuously recycled. The interceptors 35, 36 have a containment compartment for holding the extracted particulate. Optionally, the containment compartment 38 can be a separate unit disposed next too or downstream of the interceptors 35, 36.

What remains of the exhaust gas stream after it traverses the loop 30 is released back into the environment at an exhaust gas exit 45. At this point we note that the water injection stage 20 runs from the end of the turbine suction engine 15 all the way to just short of the exhaust gas exit 45. Please note that the water injector nozzles 25 can be individually controlled (e.g. turned on and off) such that the length of the water injected area of the water injection stage can be customized as needed. In addition, the pressure and quantity of water injection can be controlled by programming the injection nozzles 25 by a centralized controller 28.

In an alternative embodiment of the invention, the water injection stage 20 can be varied by disposing additional nozzles 22, 25 in the filter stage 11 and/or an area of the turbine suction engine 15. In a further embodiment, the nozzles 22, 25 are only disposed in one of or both of the filter stage 11 or the area of the turbine suction engine 15.

A water reservoir 40 is provided and provides water to the water injection stage 20. The water reservoir 40 is part of a water recycling system where water may be provided from a water source (e.g. city water pipes) or it may be collected from rain water. The pipes and pumps necessary for interconnecting the water reservoir 40 to the water injection stage 20 and the particle interceptors 35, 36 are not discussed as they are well known in the prior art.

As can be seen in FIGS. 1 and 6 the clean-air filtration system 1 is generally supported by a scaffolding 50 and/or with rubber molds 51 that support the lower segments of the loop sections 32, 33. In turn the scaffolding 50 and rubber molds 51 are supported on a concrete base 52. Due to its simplistic design, the clean-air filtration system 1 is highly versatile and flexible. It can be easily transported to any site and once the concrete base 52 has been completed, the clean-air filtration system 1 can be quickly installed.

In summary, a polluted exhaust gas stream is entrained into the air filtration system 1 where the exhaust gas stream is initially cleaned of large particulate matter by a series of initial filters 7. After traversing the filter stage 11, the exhaust gas stream passes into a turbine suction stage which sets the flow pressure and speed of the exhaust gas stream so that it may properly enter the water injection stage 20. In the water injection stage 20, the exhaust gas stream is first subjected to a "water wash" which entrains smoke, fumes, gases and particles into the passing water resulting in a gummy coagulant. The gummy coagulant traverses the loop sections 32, 33 of the water injection stage and passes into interceptors 35, 36 where the particles and the water in the gummy coagulant are separated. In this manner, the pollutants of the exhaust gas stream are removed. The cleansed exhaust gas stream is than released back out into the atmosphere. The water being cleaned and filtered in the interceptors 35, 36 is then returned to the water reservoir 40.

The invention claimed is:

1. A clean-air filtration system, comprising:
a flexible inlet tube for attaching to an exhaust gas source outputting an exhaust gas stream;
a main pipe connected to said flexible inlet tube and conducting the exhaust gas stream;
a filter system disposed downstream of said flexible inlet tube in said main pipe, said filter system having a filter for removing particulates from the exhaust gas stream;
a water source conducting water to said main pipe;
said main pipe having a section defining a water injection stage injecting water into the exhaust gas stream passing by, the water colliding with the exhaust gas stream entrapping the particulate and forming a gummy coagulant formed of the water and entrapped particulate, said main pipe in said water injection stage having a loop with a curve shape that bends around and crosses itself, said loop subjecting the gummy coagulant traversing said loop to centrifugal forces; and a particulate interceptor connected to said main pipe for receiving said gummy coagulant.

2. The clean-air filtration system according to claim 1, wherein:

said main pipe in said section defining said water injection stage is a doubled layered pipe having an outer layer, an inner layer and a space defined between said inner layer and said outer layer; and said inner layer having a plurality of nozzle openings formed therein, the water travels in said space to said nozzle openings where the water is injecting into the exhaust gas stream.

3. The clean-air filtration system according to claim 1, wherein said main pipe in said section defining said water injection stage is a doubled layered pipe having an outer layer, an inner layer and a space defined between said inner layer and said outer layer; and further comprising controllable water injectors disposed on an interior wall of said inner layer for injecting water into said exhaust gas stream.

4. The clean-air filtration system according to claim 1, wherein said particulate interceptor is gravity fed from said main pipe.

5. The clean-air filtration system according to claim 4, further comprising an outlet pipe with a pump disposed in said outlet pipe, said outlet pipe connecting said particulate interceptor to said main pipe, said pump pumping the gummy coagulant from said main pipe to said particulate interceptor.

6. The clean-air filtration system according to claim 3, further comprising a turbine suction engine disposed upstream of said water injection stage, said turbine suction engine defining a velocity and pressure of the exhaust gas stream.

7. The clean-air filtration system according to claim 6, further comprising an exhaust gas exit disposed at an end of said main pipe.

8. The clean-air filtration system according to claim 7, wherein said water injection stage extends between said turbine suction engine and said exhaust gas exit.

9. The clean-air filtration system according to claim 8, wherein said controllable water injectors are disposed along said main pipe in a section between said turbine suction engine and said exhaust gas exit, said controllable water injectors being individually controllable for defining on/off conditions, pressure conditions and spray velocity, therefore defining a customizable length of said water injection stage.

10. The clean-air filtration system according to claim 9, further comprising a controller for defining the on/off conditions, the pressure conditions and the spray velocity of the water leaving said controllable water injectors.

11. The clean-air filtration system according to claim 1, wherein said filter system has a fan for moving the exhaust gas stream along inside said main tube and a cover plate for protecting said filter and said fan from being damaged by large particulates.

12. The clean-air filtration system according to claim 11, wherein said filter system is one of at least five filter systems disposed in said main pipe.

13. The clean-air filtration system according to claim 1, wherein said filter system has a filter sensor for monitoring an operational effectiveness of said filter.

14. A method for cleaning an exhaust gas stream, which comprises the steps of:

connecting a flexible inlet tube of a clean-air filtration system to an exhaust pipe transporting the exhaust gas stream;

conducting a flow of the exhaust gas stream into a main pipe connected to the flexible inlet tube;

conducting the exhaust gas stream past a filter system disposed downstream of the flexible inlet tube in the main pipe, the filter system having a filter for removing particulates from the exhaust gas stream;

conducting the exhaust gas stream into a water injection stage of the main pipe where water is injected into the exhaust gas stream passing by, the water colliding with the exhaust gas stream entrapping particulates and water soluble gases thus forming a gummy coagulant formed of the water and entrapped particulates and gases, the water injection stage having a loop with a curved shape that bends around and crosses itself, the loop subjecting the gummy coagulant traversing the loop to centrifugal forces; and conducting the gummy coagulant into a particulate interceptor.

15. The method according to claim 14, which further comprises conducting the gummy coagulant into the particulate interceptor by a use of only gravitational forces.

16. The method according to claim 14, which further comprises:

providing the water injection stage with a plurality of controllable water injectors supported in the main pipe; and setting the controllable water injectors individually for defining on/off conditions, pressure conditions and spray velocity, therefore defining a customizable length of the water injection stage with customizable pressure conditions and spray velocities all based on a type of the exhaust gas stream.

17. The method according to claim 14, which further comprises removing the gummy coagulant from two separate sections of the loop.

18. The method according to claim 14, which further comprises: separating water portions and particulate portions in the particulate interceptor; filtering recovered water; transporting filtered water back to a water reservoir to be reused in the water injection stage; and pumping separated particulate matter to a storage tank disposed downstream of the particulate interceptor.

19. The method according to claim 14, which further comprises monitoring an operational effectiveness of the filter via a filter sensor.

* * * * *